United States Patent [19]

Flanagan

[11] Patent Number: 4,485,484

[45] Date of Patent: Nov. 27, 1984

[54] DIRECTABLE MICROPHONE SYSTEM

[75] Inventor: James L. Flanagan, Warren, N.J.

[73] Assignee: AT&T Bell Laboratories, Murray Hill, N.J.

[21] Appl. No.: 437,290

[22] Filed: Oct. 28, 1982

[51] Int. Cl.$^3$ .............................................. H04M 1/20

[52] U.S. Cl. ........................................ 381/92; 381/66; 381/111

[58] Field of Search ...................... 381/66, 92, 111, 53

[56] References Cited

U.S. PATENT DOCUMENTS

| | | | |
|---|---|---|---|
| 2,424,634 | 7/1947 | Rieber | 381/66 |
| 3,360,610 | 12/1967 | Flanagan | 179/15.55 |
| 3,662,108 | 5/1972 | Flanagan | 381/66 |
| 3,794,766 | 2/1974 | Cox et al. | 381/66 |
| 4,066,842 | 1/1978 | Allen | 179/1 P |
| 4,069,395 | 1/1978 | Nash | 381/66 |
| 4,087,633 | 5/1978 | Fitzwilliam | 381/66 |
| 4,131,760 | 12/1978 | Christensen et al. | 179/1 P |
| 4,311,874 | 1/1982 | Wallace | 381/92 |

*Primary Examiner*—Gene Z. Rubinson
*Assistant Examiner*—L. C. Schroeder
*Attorney, Agent, or Firm*—Jack S. Cubert

[57] ABSTRACT

A microphone arrangement focuses on a prescribed volume in a large room such as an auditorium. The arrangement includes a plurality of directable beam microphone structures. Each beam is directed to a prescribed location. The signals produced in the microphone structures are selectively adjusted to accept sounds from a predetermined volume surrounding the location and to reject sounds outside the prescribed volume.

19 Claims, 10 Drawing Figures

GENERAL BLOCK DIAGRAM

BEAM PROCESSING CCT

CHANNEL CCT

SIGNAL ADJUSTOR CIRCUIT

DIRECTABLE MICROPHONE SYSTEM

TECHNICAL FIELD

The invention relates to acoustic signal processing and more particularly to arrangements for modifying acoustic signals to reduce reverberation and noise.

BACKGROUND OF THE INVENTION

It is well known in the art that a sound produced within a reflective environment may traverse many diverse paths in reaching a receiving transducer. In addition to the direct path sound, delayed reflections from surrounding surfaces, as well as extraneous sounds, reach the transducer. The combination of direct, reflected and extraneous signals result in the degradation of the audio system quality. These effects are particularly noticeable in environments such as classrooms, conference rooms or auditoriums. To maintain good quality, it is a common practice to use microphones in close proximity to the sound source or to use directional microphones. These practices enhance the direct path acoustic signal with respect to noise and reverberation signals.

There are many situations, however, in which the location of the source with respect to the electroacoustic transducer cannot be controlled. In conferences involving many people, for example, it is difficult to provide each individual with a separate microphone or to devise a control system for individual microphones. One technique disclosed in U.S. Pat. No. 4,066,842 issued to J. B. Allen, Jan. 3, 1978 utilizes an arrangement for reducing the effects room reverberation and noise pickup in which signals from a pair of omnidirectional microphones are manipulated to develop a single, less reverberant signal. This is accomplished by partitioning each microphone signal into preselected frequency components, cophasing corresponding frequency components, adding the cophased frequency component signals, and attenuating those cophased frequency component signals that are poorly correlated between the microphones.

Another technique disclosed in U.S. Pat. No. 4,131,760 issued to C. Coker et al Dec. 26, 1978 is operative to determine the phase difference between the direct path signals of two microphones and to phase align the two microphone signals to form a dereverberated signal. The foregoing solutions to the noise and dereverberation problems work as long as the individual sound sources are well separated, but they do not provide spatial volume selectivity. Where it is necessary to conference a large number of individuals, e.g., the audience in an auditorium, the foregoing methods do not adequately reduce noise and reverberation since these techniques do not exclude sounds from all but the location of a desired source. It is an object of the invention to provide improved audio signal processing which reduces interference in a noisy, reverberant environment.

BRIEF SUMMARY OF THE INVENTION

The invention is directed to a signal processing arrangement that includes a plurality of directable beam electroacoustic transducers. Each transducer beam is pointed at a prescribed location. The transducer output signals are selectively adjusted to form a signal representative of sounds emanating from a predetermined volume surrounding the prescribed location.

DETAILED DESCRIPTION

Figure 1:
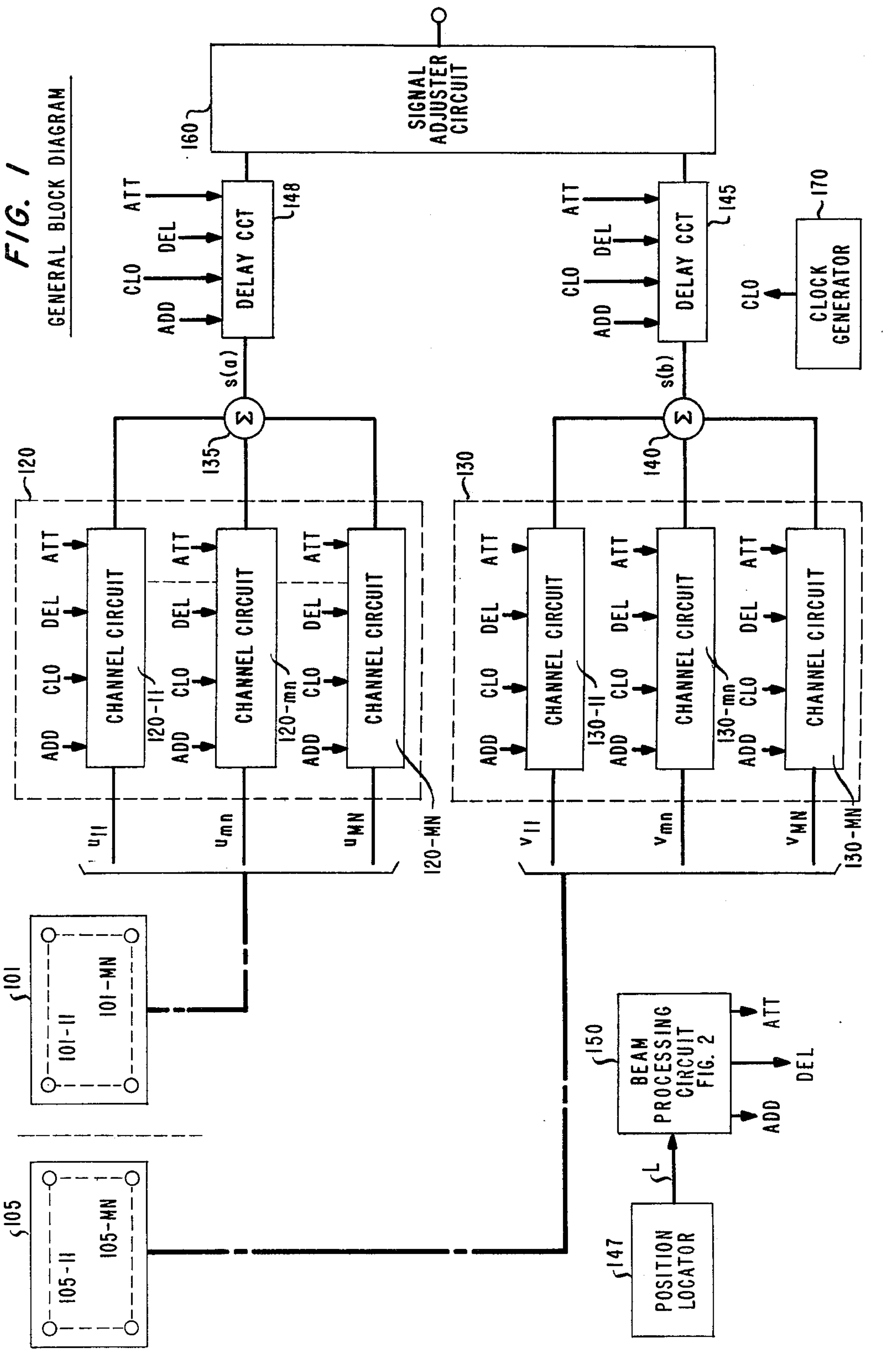
FIG. 1 depicts a general block diagram of an audio signal processing arrangement illustrative of the invention.

FIG. 1 shows a teleconferencing circuit illustrative of the invention that permits communication over a telephone connection between a large number of individuals in conference rooms such as a classroom or an auditorium, and a remote location. The circuit includes microphone arrays 101 and 105, channel processing circuit 120 associated with array 101, channel processing circuit 130 associated with array 105, signal delay circuits 145 and 148, position locator 147, beam processing circuit 150 and signal difference adjuster circuit 160. Each array comprises a rectangular arrangement of regularly spaced electroacoustic transducers. The transducer spacing is selected, as is well known in the art, to form a prescribed beam pattern normal to the array surface. It is to be understood that other two-dimensional array arrangements known in the art may also be used. In a classroom environment, array 101 may be placed on one wall while array 105 is placed on an adjacent wall so that the array beam patterns can be dynamically steered to intersect at all speaker locations in the interior of the room. The teleconferencing circuit is sensitive to sounds emanating from the spatial volume formed by the intersecting beams and is relatively insensitive to sounds, e.g., noise and reverberation, in the remainder of the room.

Each array may comprise a set of equispaced transducer elements with one element at the center and an odd number of elements in each row M and column N. The elements are spaced a distance d apart so that the coordinates of each element are $$y = md, \; -M \leqq m \leqq M \qquad (1)$$
$$z = nd, \; -N \leqq n \leqq N.$$

Figure 6:
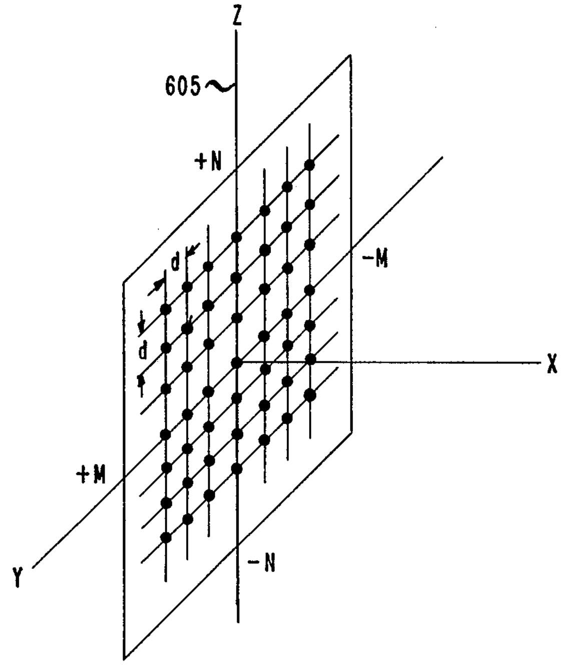
FIG. 6 illustrates a transducer arrangement useful in the circuit arrangement of FIG. 1.

The configuration is illustrated in FIG. 6 in which the array is located in the y,z plane.

The outputs of the individual transducer elements in each array produce the frequency response $$H(\theta, \phi) = \sum_m \sum_n P(m,n) = \sum_m \sum_n A(m,n)e^{-j\omega\tau(m,n)} \qquad (2)$$

where $\theta$ is the azimuthal angle measured from the x axis and $\phi$ is the polar angle measured from the z axis. $\theta$ and $\phi$ define the direction of the sound source. P is the sound pressure at element (m,n), A(m,n) is the wave amplitude and $\tau(m,n)$ is the relative delay at the m,nth transducer element. Both A(m,n) and $\tau(m,n)$ depend upon the direction $(\theta,\phi)$. $H(\theta,\phi)$ is, therefore, a complex quantity that describes the array response as a function of direction for a given radian frequency $\omega$. For a particular direction $(\theta,\phi)$, the frequency response of the array is $$H(\omega) = \sum_m \sum_n A(m,n)e^{-j\omega\tau(m,n)} \tag{3}$$

and the corresponding time response to an impulsive source of sound is $$h(t) = \sum_m \sum_n A(m,n)\delta(t - \tau(m,n)) \tag{4}$$

where $\delta(t)$ is the unit impulse function.

An impulsive plane wave arriving from a direction perpendicular to the array ($\theta=0$, $\phi=\pi/2$), results in the response $$h(t)_{o,\pi/2}=(2M+1)(2N+1)\delta(t). \tag{5}$$

If the sound is received from any other direction, the time response is a string of (2M+1) (2N+1) impulses occupying a time span corresponding to the wave transit time across the array.

In the simple case of a line array of 2N+1 receiving transducers oriented along the z axis (y=o) in FIG. 6, e.g., line 605, the response is $$h(\phi) = \sum_n A_n e^{\frac{j\omega nd}{c}\cos\phi},\ -N \leqq n \leqq N \tag{6}$$

where c is the velocity of sound. $A_n=1$ for a plane wave so that the time response is $$h(t) = \sum_n A_n\delta[t - \tau(n)] \tag{7}$$

where $$\tau_n = \left[\frac{nd\cos\phi}{c}\right],\ -N \leqq n \leqq N.$$

As shown in Equation 7, the response is a string of impulses equispaced at d cos $\phi$/c and having a duration of $$\frac{2Nd\cos\phi}{c}.$$

Alternatively, the response may be described as $$h(t) = e(t) \cdot \sum_{n=-\infty}^{\infty} \delta[t - \tau(n)] \tag{8}$$

where e(t) is a rectangular envelope and $$e(t) = 1,\ -N\frac{d\cos\phi}{c} \leqq t \leqq \frac{Nd\cos\phi}{c} \tag{9}$$

and zero otherwise. The impulse train is shown in waveform 701 of FIG. 7 and the e(t) window signal is shown in waveform 703.

The Fourier transform of h(t) is the convolution $$F[h(t)] = H(\omega) = F[e(t)]F\left[\sum_{n=-\infty}^{\infty} \delta\left(t + \frac{nd\cos\phi}{c}\right)\right] \tag{10}$$

where $$F[e(t)] = E(\omega) = \left[\frac{\sin\frac{\omega Nd\cos\phi}{c}}{\frac{\omega Nd\cos\phi}{c}}\right].$$

The Fourier transform of the e(t) (waveform 703) convolved with the finite impulse string (waveform 701) is an infinite string of $$\frac{\sin x}{x}$$

functions in the frequency domain spaced along the frequency axis at a sampling frequency increment of $$\frac{c}{d\cos\phi}$$

Figure 7:
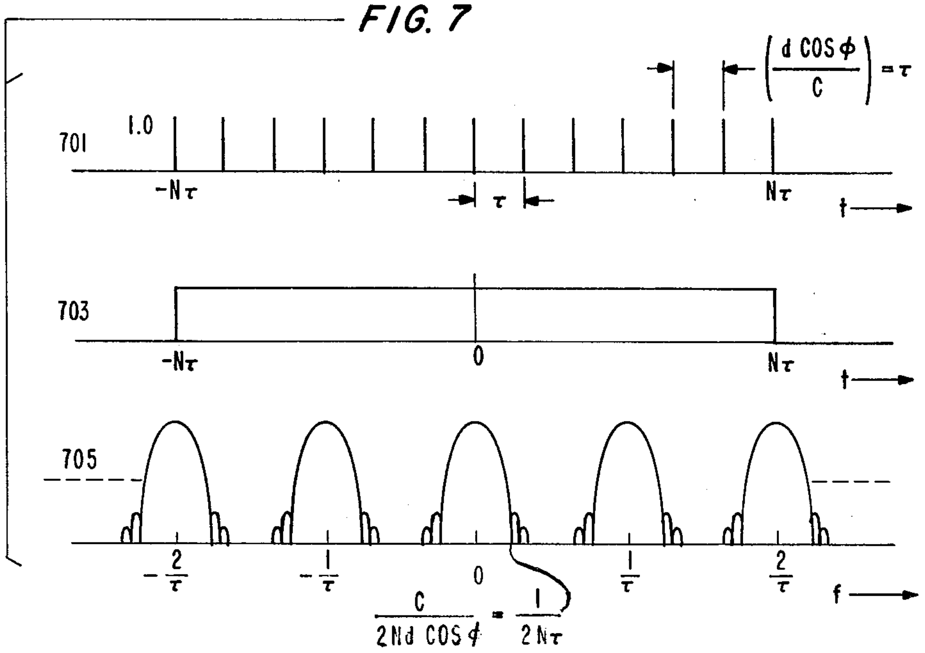
FIGS. 7, 8 and 9 show waveforms illustrating the operation of the circuit arrangement of FIG. 1.

Hz as illustrated in waveform 705 of FIG. 7.

The low bound on the highest frequency for which the array can provide directional discrimination is set by the end-on arrival condition ($\phi=0$) and is c/d Hz. Signal frequencies higher than c/d Hz lead to aliasing in the array output. The lowest frequency for which the array provides spatial discrimination is set by the first zero of the sinx/x term of Equation (10) and is c/2Nd Hz. Consequently, the useful bandwidth of the array is $$\frac{1}{2N}\left(\frac{c}{d}\right) \leqq f \leqq \left[\frac{2N-1}{2N}\right]\left[\frac{c}{d}\right]. \tag{11}$$

In general, therefore, the element spacing is determinative of the highest frequency for which the array provides spatial discrimination, and the overall dimension (2Nd) determines the lowest frequency at which there is spatial discrimination.

The foregoing is applicable to a two dimension rectangular array which can be arranged to provide two dimension spatial discrimination, i.e., a cigar-shaped beam, over the frequency range between 300 and 8000 Hz. For example, an 8 kHz upper frequency limit is obtainable with a transducer element spacing of d=(8000/c)=4.25 cm. A 300 Hz low frequency limit results from a 13 by 13 element array at spacing d=4.25 cm. The overall linear dimension of such an array is 110.5 cm. In similar fashion, circular or other arrays of comparable dimensions may also be designed with or without regular spacing. The described arrangements assume a rectangular window function. Window tapering techniques, well known in the art, may also be used to reduce sideload response. The rectangular window is obtained by having the same sensitivity at all transducer elements. The 13 by 13 rectangular array is given by way of example. It is to be understood that other configurations may also be utilized. A larger array produces a narrower beam pattern, while a smaller array results in a broader beam pattern.

Channel processor circuit 120 in FIG. 1 comprises a set of microphone channel circuits 120-11 through 120-MN. Each transducer of array 101 in FIG. 1 is connected to a designated microphone channel circuit. Upper left corner transducer 101-11 is, for example, connected to channel circuit 120-11. Upper right corner transducer 120-1N is connected to channel circuit 120-1N and lower right corner transducer 101-M,N is connected to channel circuit 120-M,N. Each channel circuit is adapted to modify the transducer signal applied thereto in magnitude and phase. Channel processor circuit 130 is connected in similar fashion to array 105 so that the transducer outputs therefrom may be modified.

The spatial response of a planar array such as 101 or 105 has the general form $$H(\theta,\phi) = \sum_m \sum_n Pe^{-j\omega\tau(m,n)}. \quad (12)$$

$\tau$(m,n) is a delay factor that represents the relative time of arrival of the wavefront at the m,nth transducer element in the array. Channel circuits 120 and 130 are operative to insert delay $-\tau$(m,n) and amplitude modifications in each transducer element (m,n) output so that the array output is cophased with an appropriate window function for any specified $\theta,\Phi$ direction. A fixed delay $\tau_0$ in excess of the wave transit time across one half the longest dimension of the array is added to make the system causal. The spatial response of the steerable beam is then $$H(\theta,\phi) = \sum_m \sum_n Pe^{j\omega[\tau(m,n)]}e^{-j\omega[\tau_o - \tau'(m,n)]}. \quad (13)$$

In a rectangular array, the steering term is $$\tau'(m,n) = -\frac{d}{c}(m\sin\Phi\sin\theta + n\cos\Phi) \quad (14)$$

with $$\tau_o \geqq (M^2+N^2)^{\frac{1}{2}}d/c. \quad (15)$$

The beam pattern of the array can then be controlled by supplying a $\tau'$(m,n) delay signal to each transducer element. These delay signals may be selected to point the array beam in any desired direction ($\theta,\Phi$) in three spatial dimensions.

Beam processor circuit 150 receives location signals L from position locator 147. The location signals correspond to prescribed directions ($\theta,\Phi$) in Equation 14. Position locator 147 may comprise a manually directed location device, an automatic location device that produces location signals responsive to actions of individuals in a conference room, or an automatic sound location device known in the art. Processor 150 then generates channel circuit delay signals and channel circuit attenuation signals responsive to the location signals L from device 147.

Figure 2:
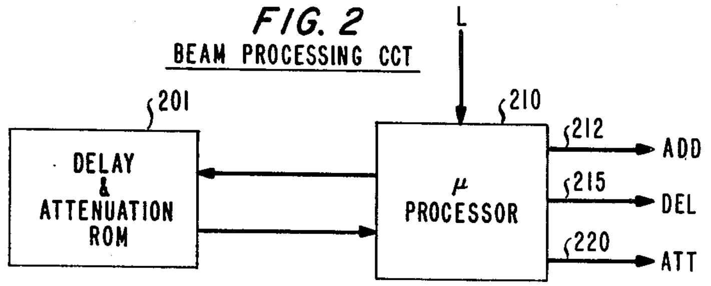
FIG. 2 shows a block diagram of a beam processing circuit that may be used in the circuit arrangement of FIG. 1.

Processor circuit 150, shown in greater detail in FIG. 2, comprises delay and attenuation signal read only memory (ROM) 201 and signal processor 210. ROM 201 contains a permanently stored table of delay and attenuation codes arranged according to location in the teleconference room. For each location L, there is a set of 2MN addressable delay and attenuation codes corresponding to the transducer elements of arrays 101 and 105. When a prescribed location L in ROM 201 is addressed, delay and attenuation codes are made available for each transducer channel circuit of channel processors 120 and 130.

Signal processor 210 may comprise a microprocessor circuit arrangement such as the Motorola 68000 described in the publication MC68000 16 *Bit Microprocessor User's Manual,* Second edition, Motorola, Inc., 1980 and associated memory and interface circuits. The operation of the signal processor is controlled by permanently stored instruction codes contained in a read only memory which are listed in Fortran language format in Appendix A hereto. The processor periodically receives room location signals L and supplies location address signals to ROM 201. Rsponsive to each location signal L, the processor sequentially addresses the transducer element channel circuit delay and attenuation codes of the currently addressed location in ROM 201. Each channel circuit address signal is applied to the channel address input of ROM 201. The delay and attenuation signals corresponding to the current channel address are retrieved from ROM 201 and are supplied to lines 215 and 220. These lines are, in turn, connected to the channel circuits of channel processors 120 and 130. The delay and attenuation signals are thereby applied to all the channel circuits of channel processors 120 and 130 in parallel. The current channel address is supplied to all channel circuits via address line 212.

Figure 10:
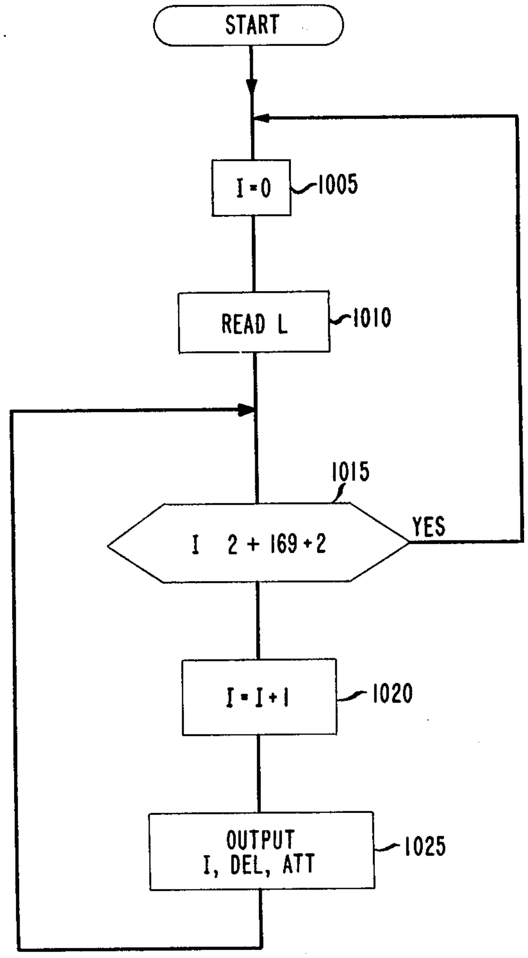
FIG. 10 shows a flow chart describing the operation of the beam processing circuit of FIG. 2.

The operation of the processor is illustrated in the flow chart of FIG. 10. Referring to FIG. 10, the channel address I is initially reset to zero when the processor of FIG. 1 is enabled. Location signal L is then accepted as per box 1010. The current address signal I is compared to the last address (box 1015). Until the last address is exceeded. I is incremented in the processor as per box 1020 and the address, delay and attenuation signals for address I and location L are output to the channel circuits of channels 120 and 130 and to delay circuits 145 and 148 (1025). After the last address I=ADD has been processed, box 1005 is reentered so that the processing is initiated for the current location signal L.

Figure 3:
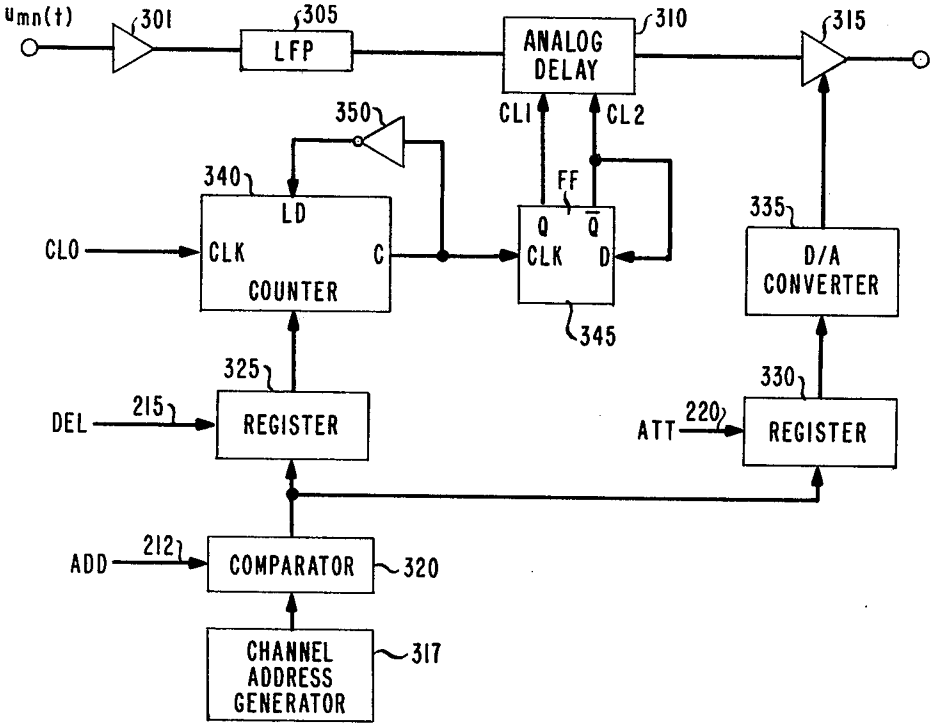
FIG. 3 shows a detailed block diagram of a channel circuit useful in the circuit arrangement of FIG. 1.

FIG. 3 shows a detailed block diagram of the channel address circuit used in channel processors 120 and 130. As indicated in FIG. 3, the output of a predetermined transducer, e.g., $u_{m,n}$(t), is applied to the input of amplifier 301. The amplified transducer signal is filtered in low pass filter 305 to eliminate higher frequency components that could cause aliasing. After filtering, the transducer signal is supplied to analog delay 310 which retards the signal responsive to the channel delay control signal from processor 150. The signal from delay 310 is then passed through gain control amplifier 315 so that the magnitude of the channel signal is modified in accordance with the attenuation control signal from processor 150. The delay and attenuation in the channel circuits of channel processor 120 transform the transducer outputs of array 101 into a controlled beam pattern signal. In like manner, the delay and attenuation in channel circuits of processor 130 are effective to generate a controlled beam pattern signal corresponding to the transducer outputs of array 105.

The analog delay in FIG. 3 may comprise a bucket brigade device such as the Reticon type SAD-1024 analog delay line. As is well known in the art, the delay through the Reticon type device is controlled by the clock rate of clock signals applied thereto. In FIG. 3, the current delay control signal from processor 150 is applied to register circuit 325. The current channel address signal is applied to the input of comparator 320. The other input to comparator 320 is the address ADD of the local channel circuit from channel address generator 317. When the address signal on address line 212 matches the local channel circuit address, comparator circuit 320 is enabled and the delay control signal on line 215 from microprocessor 210 is inserted into register 325.

Counter 340 comprises a binary counter circuit operative to count constant rate clock pulses CLO from clock generator 170. Upon attaining its maximum state, counter 340 provides a pulse on its c output which reverses the state of flip-flop circuit 345. This pulse is also applied to the counter load input via inverter circuit 350 so that the delay control signal stored in register 325 is inserted into counter 340. The counter then provides another maximum count signal to flip-flop 345 after a delay corresponding to the difference between the delay control signal value and the maximum state of the counter.

The pulse output rate from flip-flop 345 which controls the delay of the filtered transducer signal in analog delay 310 is then an inverse function of the delay control signal from processor 150. An arrangement adapted to provide a suitable delay range for the transducer arrays described herein can be constructed utilizing, for example, a seven stage counter and an oscillator having a CLO clock rate of 12.8 MHz. With a 512 stage bucket brigade device of the Reticon type, the delay is $$d = \frac{512(128 - n)}{12.8 \text{ MHz}} \quad (16)$$

where n may have values between 1 and 119. The resulting delay range is between 0.36 ms and 5.08 ms with a resolution of 0.04 ms.

Channel processor circuit 120 is effective to spatially filter the signals from the transducer elements of array 101. Consequently, the summed signal obtained from adder 135 is representative of the sounds in the beam pattern defined by the coded delay and attenuation signals in ROM 201 for location L. In similar fashion, channel processor 130 spatially filters the transducer element outputs of array 105 and the signal from adder circuit 140 correspond to the sounds in the beam pattern defined by the coded signals in ROM 201 for array 105 pointing in the direction of location L.

Delay circuits 145 and 148 are adapted to compensate for the difference in transit time between location L and arrays 101 and 105. Responsive to location signal L, processor 150 is operative to generate a delay signal $$\tau_\Delta = \tau_{d1} - \tau_{d2} \quad (17)$$

where $\tau_{d1}$ is the sound wave transit time from location L to the center of array 101 and $\tau_{d2}$ is the sound wave transit time from location L to the center of array 105. For $\tau_{d1} > \tau_{d2}$, signal $\tau_\Delta$ is applied to the control input of adjustable delay circuit 145 which retards the signal from adder 135 with respect to the signal from adder 140. Alternatively, if $\tau_{d1} < \tau_{d2}$, signal $\tau_\Delta$ is supplied to the control input of adjustable delay circuit 148 and the timing of the array output signals is equalized. Each of delay circuits 145 and 148 may comprise the channel circuit of FIG. 3 to which the transit delay signal is applied as the delay signal. Circuits 145 and 148 receive control signals from processor 150 responsive to the current location signal L.

The outputs of summing circuits 135 and 140 may be combined so that the resulting signal is representative of sounds emanating from the controlled volume formed by the intersection of the beam patterns of arrays 101 and 105 around location L. In accordance with the invention, a focal volume of predetermined dimensions is defined for any prescribed location L in a teleconference room. Sounds originating in the focal volume are enhanced with respect to reflected and extraneous sounds outside the focal volume. Consequently, the invention is effective to focus on a sound source, e.g., a speaker at location L while reverberations, sounds of other talkers in the room and noise are reduced.

Focal volume discrimination may be achieved by simply adding the beam processed transducer signals from adder circuits 135 and 140. The resulting signal, however, is not uniform in sensitivity for all points within the desired focal volume. Thus, movement of the sound source, e.g., talker, within the focal volume causes large variations in the combined beam pattern signal. This is due to phase interference between the beam processed signals that occur if the transducer arrays are not equidistant from the talker location.

The resultant beam processed signal may be expressed as $$v(t) = s_a(t) + s_b(t) \quad (18)$$

where $s_a(t)$ is the output of adder circuit 135 and $s_b(t)$ is the output of adder circuit 140. The Fourier transform of v(t) is $$R(\omega) = S_a(\omega)e^{-j\beta a(\omega)} + S_b(\omega)e^{-j\beta b(\omega)} \quad (19)$$

where $R(\omega)$ is a complex function of the radian frequency $\omega$ and $S(\omega)$ and $\phi(\omega)$ are respectively the amplitude and phase spectra of the individual arrays. The absolute magnitude of $R(\omega)$ (the amplitude spectrum of the combined output) is $$|R(\omega)| = |S_a(\omega)e^{-j\beta a(\omega)} + S_b(\omega)e^{-j\beta a(\omega)}|. \quad (20)$$

In general, $\beta_a$ and $\beta_b$ in Equation 20 are not equal. Consequently, the magnitude response for a given frequency $\omega$ is a strong function of the distance from the focal volume center, and small movement of the signal source from the center of the focal volume causes large fluctuations in the response $|R|$. It is desired that no fluctuations occur over a prescribed volume surrounding the focal point.

Figure 8:
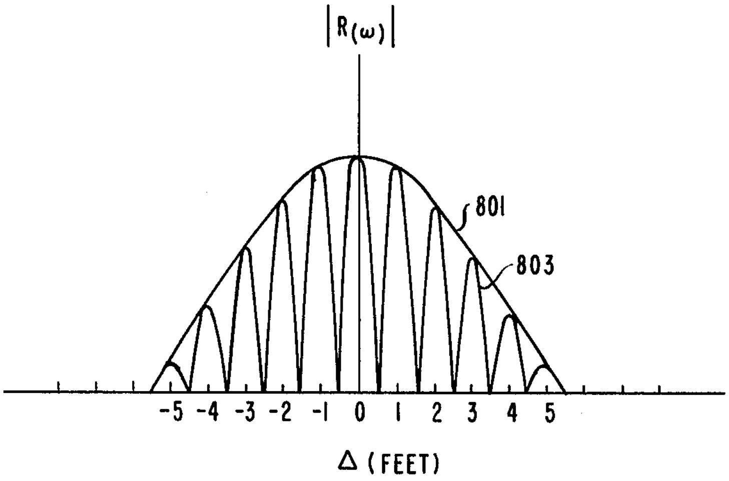

FIG. 8 illustrates the variation in $R(\omega)$ that can be expected from directly adding the beam processed outputs as in Equation 20. Envelope 801 in FIG. 8 corresponds to the spatial volume defined by the intersection of the two beams. The variation in the response curve 803 under the envelope is caused by time delay differences between the two signals $s_a(t)$ and $s_b(t)$ which result in phase spectrum differences. These large variations over relatively small distances from the focal volume center result in fade in and out of a speaker's remarks if he moves his head or shifts in his seat within the focal volume. In accordance with the invention, the transit time difference problem is solved by modifying the beam pattern signals and summing the modified signals in signal adjuster circuit 160.

Figure 4:
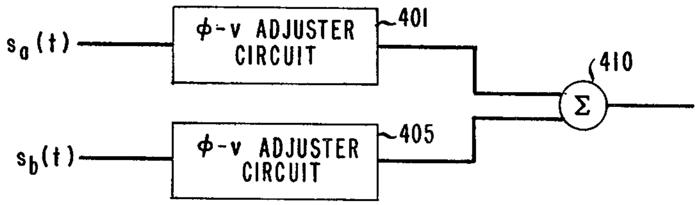
FIG. 4 shows a general block diagram of a signal adjuster circuit useful in the circuit arrangement of FIG. 1.

The signal adjuster circuit, shown in FIG. 4, is adapted to modify signals $s_a(t)$ and $s_b(t)$ so that the effects of transit time differences are removed. Referring to FIG. 4, the beam processed signal from array 101, $s_a(t)$ is applied to the input of adjuster circuit 401 while signal $s_b(t)$ derived from array 105 is supplied to adjuster circuit 405. Each of circuits 401 and 405 is adapted to alter the phase characteristics of the signal applied thereto so that the $\beta_a$ and $\beta_b$ terms of Equation 19 are equal. As a result, the addition of the signal outputs of circuits 401 and 405 produces a teleconference output signal having an amplitude spectrum of the form.

$$|R(\omega)| = |S_a(\omega)| + |S_b(\omega)|. \tag{21}$$

Figure 9:
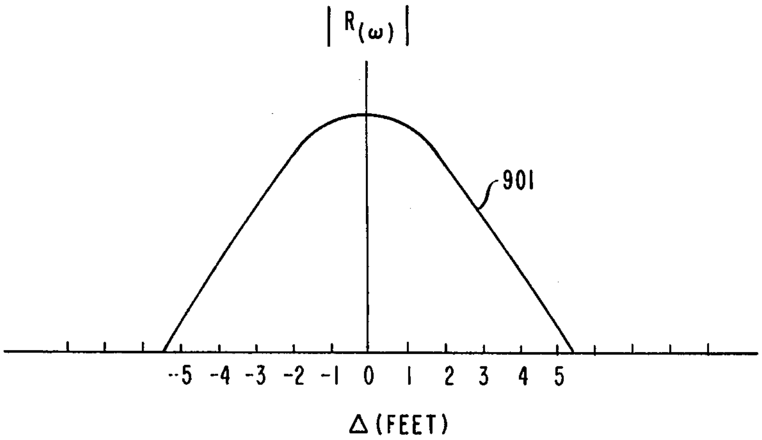

The response curve corresponding to Equation 21 as a function of distance from the focal volume center is shown in curve 901 of FIG. 9. As is readily seen from FIGS. 8 and 9, curve 901 is substantially the same as the envelope curve 801. Consequently, the spatial discrimination is only a function of the amplitude spectra of the processed beam pattern signals from arrays 101 and 105, but is not dependent upon their phase spectra.

Figure 5:
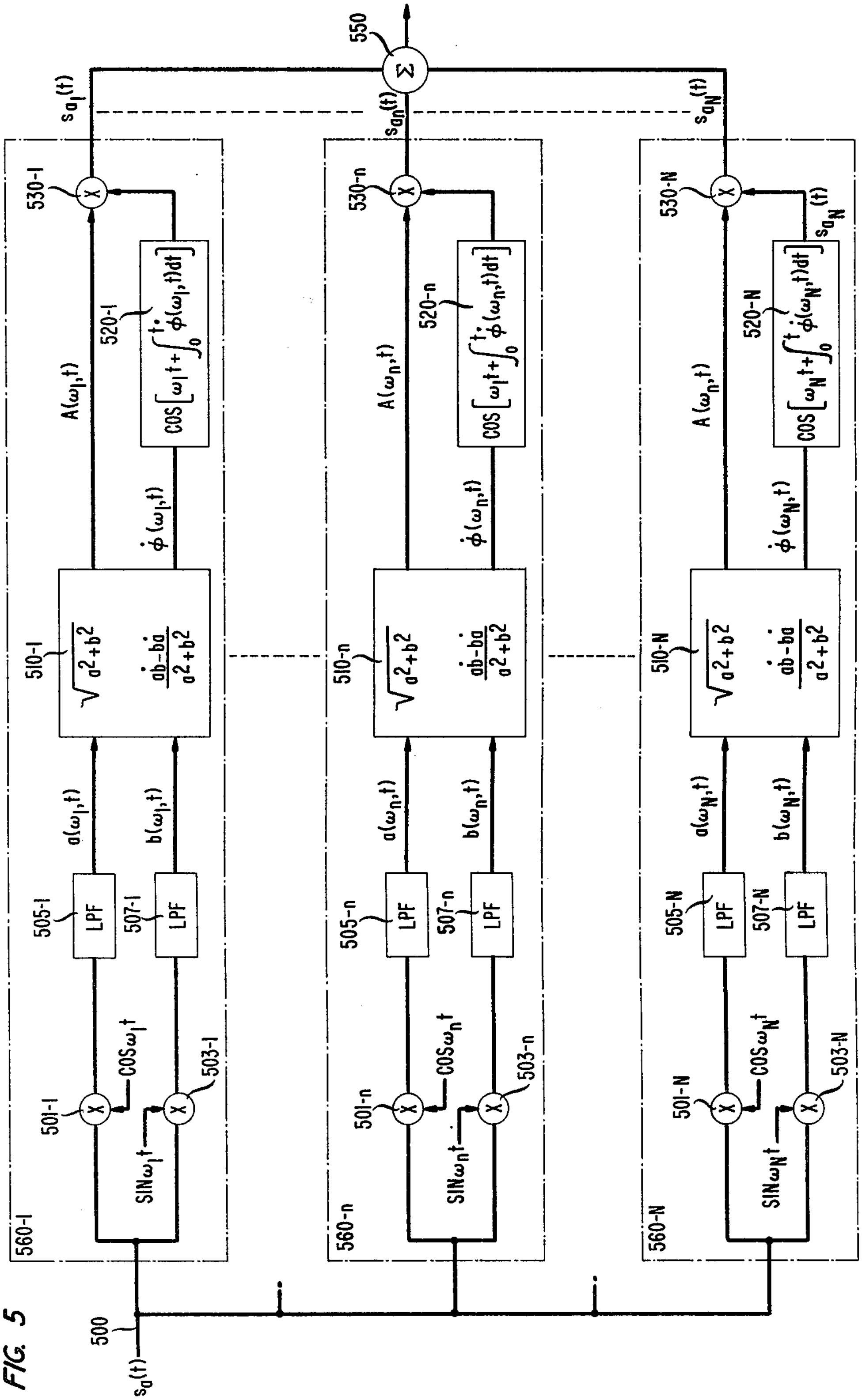
FIG. 5 shows a detailed block diagram of a phase adjuster circuit arrangement that may be used as the signal adjuster circuit of FIG. 4.

FIG. 5 shows an arrangement that may be used as adjuster circuit 401 and 405 in FIG. 4. Referring to FIG. 5, signal $s_a(t)$ is applied to input line 500 and is distributed therefrom to the inputs of filter circuits 560-1 through 560-N. Each filter circuit is adapted to accept a portion of the input signal spectrum and to modify that spectrum portion so that the phase is reset to a predetermined value. The arrangement in FIG. 5 is based on the phase vocoder disclosed in U.S. Pat. No. 3,360,610 issued to J. L. Flanagan, Dec. 26, 1967 which produces a representation of a signal in terms of its amplitude and phase-derivative evaluated at prescribed frequencies. In FIG. 5, the signal analysis is made at 200 Hz intervals and covers the range of frequencies from 100 Hz to 3300 Hz. Filter 560-1, for example, may cover the frequency range of 100 Hz to 300 Hz. Filter 560-N is adapted to cover the range from 3100 Hz to 3300 Hz. The other filters cover the intermediate 200 Hz ranges.

In circuit 560-1, multiplier 501-1 is operative to modulate signal $s_a(t)$ with a cosine wave of radian frequency $\omega_1$ corresponding to a center frequency of 200 Hz. The output of multiplier 501-1 passes through low pass filter 505-1 which generates a signal corresponding to the real part of the spectral portion of $s_a(t)$ between 100 and 300 Hz. Multiplier 503-1 and low pass filter 507-1 are operative to produce a signal corresponding to the imaginary part of the spectral portion of $s_a(t)$ between 100 Hz and 300 Hz. The bandwidth of the low pass filter is set to cover the focal volume or a predetermined portion thereof. If, for example, it is desired to eliminate phase interference over a focal volume of $2\Delta$ feet in radius, a bandwidth of approximately $1/\Delta$ is required. Thus, the 200 Hz bandwidth in FIG. 5 prevents fade in and fade out problems over the focal volume illustrated in FIGS. 8 and 9.

Signals $a(\omega_1,t)$ and $b(\omega_1,t)$, representative respectively of the real and imaginary parts of the shorttime spectrum of $s_a(t)$ evaluated at frequency $\omega_1$, are applied to processing circuit 510-1 which generates an amplitude representative signal $A(\omega_1,t)$ and a phase derivative representative signal $\dot{\phi}(\omega_1,t)$. Signal $A(\omega_1,t)$ is applied directly to one input of multiplier circuit 530-1. Signal $\dot{\phi}(\omega_1,t)$ passes through phase angle generator circuit 520-1 which is operative to produce a phase angle representative signal corresponding to the 100–300 Hz range of the beam processed signal applied to the input to the circuit of FIG. 5. The output of phase angle generator circuit 520-1 and signal $A(\omega_1,t)$ is combined in multiplier 530-1 to produce a signal $$\hat{s}_{a1}(t) = |S_a(\omega_1,t)| \left( \cos(\omega_1 t + \int_0^t \dot{\phi}(\omega_1,t)dt \right) \tag{22}$$

representative of the spectral portion of input signal $s_a(t)$ that has a prescribed phase characteristic. Filter circuits 560-2 through 560-N operate in similar manner so that the outputs therefrom are spectral representative signals $\hat{s}_{an}(t)$, $n=2 \ldots, N$, having the same prescribed phase characteristics as circuit 560-1. Signals $s_{an}(t)$, $n=1,2 \ldots, N$, are summed in adder circuit 550 whereby a signal $\hat{s}_a(t)$ corresponding to a phase adjusted version of the beam processed input signal $s_a(t)$ is provided. Since the outputs of both phase vocoder adjuster circuits in FIG. 4 have identical phase characteristics, the fade in and fade out illustrated in FIG. 8 is avoided.

The invention has been described with reference to a particular embodiment. It is to be understood that various other arrangements and modifications may be made by those skilled in the art without departing from the spirit and scope of the invention. For example, the described directable beam transducer arrays may be spaced apart on the same or opposite walls in a multitiered auditorium and may be directed to prescribed locations in the various tiers thereof.

APPENDIX A

```
INTEGER  DEL(64,2*169+2), ATT(64,2*169+2)
10       READ(1,100)(L)
C        DEVICE 1 IS POSITION LOCATOR, DEVICE
         2 IS CHANNEL
C        CIRCUIT
100      FORMAT (I5)
         DO 20 I=1,2*169+2,1
20       WRITE(2,200)(I,DEL(L,I), ATT(L,I))
         GOTO 10
200      FORMAT(I5,I5,I5)
         STOP
         END
```

What is claimed is:

1. A signal processing arrangement for reducing audio interference in a reverberative environment comprising:

a plurality of directable beam forming electroacoustic transducer means;

means for steering the beam of each transducer means to a prescribed location in said environment; and means responsive to the output signals of said directable beam forming transducer means for forming a signal corresponding to sounds emanating from a predetermined volume surrounding said prescribed location.

2. A signal processing arrangement for reducing audio interference in a reverberative environment according to claim 1 wherein each directable beam forming transducer means comprises:

an array of spaced electroacoustic transducer elements each being adapted to generate a signal corresponding to sound waves incident thereon; and means responsive to the transducer element signals for generating a signal representative of sound waves within a prescribed beam pattern.

3. A signal processing arrangement for reducing audio interference in a reverberative environment according to claim 2 wherein said means for forming a signal corresponding to sounds emanating from a predetermined volume surrounding said prescribed location comprises means responsive to said prescribed beam pattern representative signals for adjusting the characteristics of each beam pattern representative signal.

4. A signal processing arrangement for reducing audio interference in a reverberative environment according to claim 3 wherein said adjusting means comprises means responsive to each beam pattern representative signal for reducing the phase differences between said beam pattern representative signals.

5. A signal processing arrangement for reducing audio interference in a reverberative environment according to claim 4 wherein said phase difference reducing means comprises means for rendering the phase characteristic of each beam pattern representative signal substantially similar to the phase characteristic of the other beam pattern representative signals.

6. A signal processing arrangement for reducing audio interference in a reverberative environment according to claim 5 wherein said beam pattern representative signal phase characteristic similarity rendering means comprises means for partitioning said beam pattern representative signal into a plurality of frequency bands, means responsive to each frequency band signal for generating a band representative signal having a prescribed phase characteristic, and means responsive to said band representative signals for forming a beam pattern representative signal replica having a predetermined phase characteristic.

7. A signal processing arrangement for reducing audio interference in a reverberative environment according to claim 6 wherein each beam pattern representative replica signal has substantially the same phase characteristic.

8. A signal processor for reducing audio interference in a reverberative environment comprising:

first and second directable beam forming electroacoustic transducer means;

means for directing the beams of the first and second transducer means to a pescribed location in said environment; and means for selectively adjusting the differences between the output signals of said first and second transducer means to generate a signal representative of sounds emanating from a prescribed volume surrounding said prescribed location.

9. A signal processing arrangement for reducing audio interference in a reverberative environment according to claim 8 wherein each directable beam forming transducer means comprises:

an array of regularly spaced electroacoustic transducer elements each being adapted to generate a signal corresponding to sound waves incident thereon; and means responsive to the transducer element signals, said transducer element spacing and the number of transducer elements for generating a signal representative of sound waves within a prescribed beam pattern.

10. A signal processing arrangement for reducing audio interference in a reverberative environment according to claim 9 wherein said difference adjusting means comprises:

means responsive to said first transducer means output signal for generating a third signal having a predetermined phase characteristic; and means responsive to said second transducer means output signal for generating a fourth signal having substantially the same phase characteristic.

11. A signal processing arrangement for reducing audio interference in a reverberative environment according to claim 10 wherein each of said third and fourth signal generating means comprises:

means for partitioning said transducer means output signal into a plurality of frequency bands, means responsive to each frequency band signal for generating a band representative signal having a prescribed phase characteristic, and means responsive to said band representative signals for forming a beam pattern representative signal replica having a predetermined phase characteristic.

12. A signal processing arrangement for reducing audio interference in a reverberative environment according to claim 11 wherein said reverberative environment is a room, said first transducer array is located on one wall of said room and said second transducer array is located on an adjacent wall of said room.

13. A method of reducing audio interference in a reverberative environment having a plurality of directable beam electroacoustic transducers each including an array of spaced electroacoustic transducer elements each being adapted to generate a signal corresponding to sound waves incident thereon comprising the steps of:

steering the beam of each directable beam transducer to a prescribed location in said environment; and forming a signal corresponding to sounds emanating from a predetermined volume surrounding said prescribed location responsive to the output signals of said directable beam transducers.

14. A method for reducing audio interference in a reverberative environment according to claim 13 wherein said signal formation comprises:

generating a signal representative of sound waves within a prescribed beam pattern responsive to the transducer element signals.

15. A method for reducing audio interference in a reverberative environment according to claim 14 wherein forming a signal corresponding to sounds emanating from a predetermined volume surrounding said prescribed location further comprises adjusting the phase characteristics of each beam pattern representative signal responsive to said prescribed beam pattern representative signals.

16. A method for reducing audio interference in a reverberative environment according to claim 15 wherein said phase adjusting step comprises reducing the phase differences between said beam pattern representative signals responsive to each beam pattern representative signal.

17. A method for reducing audio interference in a reverberative environment according to claim 16 wherein said phase difference reducing comprises rendering the phase characteristic of each beam pattern representative signal substantially similar to the phase characteristic of the other beam pattern representative signals.

18. A method for reducing audio interference in a reverberative environment according to claim 17 wherein said beam pattern representative signal phase characteristic similarity rendering comprises partitioning said beam pattern representative signal into a plurality of frequency bands, generating a band representative signal having a prescribed phase characteristic responsive to each frequency band signal, and forming a beam pattern representative signal replica having a predetermined phase characteristic responsive to said band representative signals.

19. A method for reducing audio interference in a reverberative environment according to claim 18 wherein each beam pattern representative replica signal has substantially the same phase characteristic.

* * * * *

UNITED STATES PATENT AND TRADEMARK OFFICE

CERTIFICATE OF CORRECTION

PATENT NO. : 4,485,484

DATED : November 27, 1984

INVENTOR(S) : James L. Flanagan

It is certified that error appears in the above-identified patent and that said Letters Patent is hereby corrected as shown below:

Column 5, line 36, "$Pe^{j\omega}$" should read --$Pe^{-j\omega}$--. Column 6, line 17, "Rsponsive" should read --Responsive--.

Signed and Sealed this

*Tenth* Day of *December 1985*

[SEAL]

*Attest:*

DONALD J. QUIGG

*Attesting Officer* *Commissioner of Patents and Trademarks*